United States Patent [19]

Marx et al.

[11] 4,305,861

[45] Dec. 15, 1981

[54] PROCESS FOR THE MANUFACTURE OF STABLE POLYMER POLYOL DISPERSIONS

[75] Inventors: Matthias Marx, Bad Durkheim; Dietmar Nissen, Heidelberg; Robert Gehm, Limburgerhof, all of Fed. Rep. of Germany

[73] Assignee: BASF Aktiengesellschaft, Ludwigshafen, Fed. Rep. of Germany

[21] Appl. No.: 198,519

[22] Filed: Oct. 20, 1980

[30] Foreign Application Priority Data

Oct. 30, 1979 [DE] Fed. Rep. of Germany ....... 2943689

[51] Int. Cl.³ .............................................. C08K 5/05
[52] U.S. Cl. .......................... 260/31.6; 260/33.2 EP; 260/33.4 EP; 528/119; 528/121; 528/407
[58] Field of Search ............... 260/33.4 EP, 31.4 EP, 260/33.2 EP, 31.6; 528/119, 121, 407

[56] References Cited

U.S. PATENT DOCUMENTS

| | | | |
|---|---|---|---|
| 3,634,303 | 1/1972 | Vandenberg | 260/33.2 EP |
| 4,089,835 | 5/1978 | König et al. | 260/31.6 |
| 4,189,539 | 2/1980 | Ward | 521/25 |
| 4,206,109 | 6/1980 | Reischl et al. | 260/33.2 R |

Primary Examiner—Joseph L. Schofer
Assistant Examiner—Bernard Lipman
Attorney, Agent, or Firm—Norbert M. Lisicki

[57] ABSTRACT

Polymer polyol dispersions are prepared by reacting polyepoxides with epoxide resin hardeners in the presence of polyester and polyoxyalkylene polyether polyols.

4 Claims, No Drawings

PROCESS FOR THE MANUFACTURE OF STABLE POLYMER POLYOL DISPERSIONS

BACKGROUND OF THE INVENTION

1. Field of the Invention

This invention relates to a process for the manufacture of stable polymer polyol dispersions with a narrow distribution of particle sizes prepared by the precipitation polymerization of polyepoxides with epoxide resin hardeners in the presence of polyols.

2. Description of the Prior Art

The use of polyamines, particularly diamines, for cross-linking polyepoxides, for example, epoxy adhesives or lacquers, paints, and varnishes is part of the current state of the art. The hardening process is advantageously carried out in the absence of solvents. If required, volatile solvents, which are inert under the reaction conditions, are used.

The production of polyaddition products from diisocyanates and bifunctional amines, hydrazines and hydrazides, in high molecular weight polypropylene glycol ethers containing at least two hydroxyl groups has also been taught. Such dispersions are suitable as thickening pastes in textile or dying auxiliaries. For other areas of application, the high viscosity and the limited stability are drawbacks, particularly for ease of processability. In order to reduce these difficulties, it has been recommended that the polyaddition reaction be conducted in continuous flow-through mixers with high mixing output.

While the primary reaction occurs between the NCO and $NH_2$ groups, the secondary reaction between the hydroxyl-group containing polyols and the polyisocyanate cannot be totally eliminated. This reaction results in polymer polyol dispersions of various compositions which either can not be reproduced or are very difficult to reproduce. Another drawback is the irregular form of the polymer and the wide particle size distribution of the polymer as well as the relatively high viscosity of the dispersion which is usually greater than 2,500 centipoises in a 10 percent dispersion at 25° C.

The purpose of this invention was to produce stable polymer polyol dispersions with low viscosities in which the dispersed polymer particles are chemically and morphologically uniform, in which the average polymer particle diameters are small, and in which the polymer particle size distribution is narrow.

This task is met by a process for the manufacture of stable polymer polyol dispersions with narrow particle size distribution by means of precipitation polymerization wherein the polyepoxides are reacted with epoxide resin hardeners in the presence of polyols which are liquid at reaction temperatures.

DESCRIPTION OF THE PREFERRED EMBODIMENT

The polymer polyol dispersions are preferably produced as follows:

The polyepoxides and epoxide resin hardeners are dissolved in the polyols in such quantities that the resultant polymer polyol dispersions contain 1 to 50 percent by weight, preferably 5 to 20 percent by weight, polymer particles based on the total weight. It is of little consequence whether the reagents are dissolved in the polyol together or whether one of the components is placed in the polyol and the other is added as necessary for the reaction. Following this, the polyaddition reaction is allowed to take place at a rate of reaction which can be adjusted by means of the reaction temperature. During this process, the initially clear solution changes into a cloudy dispersion. The course and the end of the reaction can be determined by means of viscosity measurements. The size of the polymer particles in the polyol dispersion can be influenced by the selection of the raw materials as well as their concentration in the polyol and the reaction temperature. Reaction temperatures of $-20°$ C. to $+150°$ C., preferably 0° to 100° C., have proven to work well. The use of temperatures of approximately 40° to 60° C., and concentrations of 15 to 25 percent by weight based on the total weight, results in the formation of larger polymer particles, for example, having an average particle diameter of 3 to 8 microns. The use of temperatures of approximately 3° to 15° C. and concentrations of 1 to 5 percent by weight, based on the total weight, results in the formation of small polymer particles such a those with average particle diameters of less than 2 microns. The reaction times are a function of the temperature and most particularly, are dependent upon the chemical structure of the epoxide resin hardener. When using polyamines as epoxide resin hardeners, for instance, the rate of the polyaddition reaction can be influenced by the basicity as well as by steric factors. Generally, the reaction times are between 30 minutes and 96 hours, preferably between 1 and 24 hours.

As already indicated, the polymer polyol dispersions produced according to the process of this invention contain 1 to 50 percent by weight of polymer particles, preferably 5 to 20 percent by weight, based on the total weight. With a polymer content of 10 percent by weight in polyether polyol at 25° C., the dispersions have viscosities of 1,000 to 2,500 centipoise, preferably 1,000 to 1,500 centipoise, and can therefore be processed easily using commonly available processing machines.

Another surprising result is that the in situ polyaddition of the reactant in polyol results in polymers in the form of isometric spherical particles having diameters of 0.01 to 10 microns, preferably 0.05 to 5 microns, and that the particle size distribution is very narrow.

The polymer polyol dispersions produced according to this invention may be mixed with other polyols and may be adjusted to the required solids content prior to further processing.

The products are used, for instance, as clouding agents for plastic materials.

The polymer polyol dispersions produced according to this invention contain such finely dispersed polymer particles that no sedimentation occurs after a six month storage. Another advantage is that the dispersions in polyether polyols which, with a solids content of 20 percent by weight, normally have a viscosity of less than 2,500 centipoise, and preferably of 1,000 to 1,500 centipoise, at 25° C. can be processed well without requiring special equipment.

The viscosities of the polymer polyol dispersions produced according to this invention in polyester polyols are somewhat higher as a rule since the viscosities of the pure polyester polyols are generally higher. The important fact, however, is that the viscosity is not decisively increased by the dispersed polymer particles even when these particles are present in higher concentrations, for example, of 10 to 15 percent by weight.

Polyols, suitable as dispersing medium and liquid at reaction temperature, have functionalities of 2 to 8, preferably of 2 to 4, and molecular weights of 200 to 8,000, preferably of 800 to 6,000. Proven to work well and therefore preferably used are polyester polyols and particularly polyoxyalkylene polyether polyols. Other hydroxyl-group containing polymers with the above mentioned molecular weight such as polyester amides, polyacetals and polycarbonates, particularly those produced by transesterification of diphenylcarbonate and 1,6-hexanediol may be employed.

The polyester polyols may be produced, for instance, from the reaction of dicarboxylic acids, preferably aliphatic dicarboxylic acids having 2 to 12, preferably 4 to 8, carbon atoms in the alkylene radical and multi-functional alcohols, preferably diols. These include aliphatic dicarboxylic acids such as pimelic acid, suberic acid, azelaic acid, sebacic acid, undecanedioic acid, dodecanedioic acid, and preferably succinic, glutaric and adipic acid, and aromatic dicarboxylic acids such as phthalic acid and terephthalic acid as well as mixtures of such carboxylic acids. Examples of di- and multifunctional, particularly trifunctional, alcohols are: diethylene glycol, 1,2- or 1,3-propylene glycol, dipropylene glycol, 1,5-pentanediol, 1,10-decanediol, glycerine, trimethylolpropane, and preferably ethylene glycol, 1,4-butanediol, and 1,6-hexanediol.

The polyester polyols have molecular weights of 200 to 8,000, preferably 800 to 3,500, most preferably of 1,500 to 2,800, and hydroxyl numbers of 35 to 180, preferably of 40 to 110.

Preferably used as polyols, however, are polyoxyalkylene polyether polyols which are produced by processes well known to those skilled in the art by the reaction of one or more alkylene oxides with 2 to 4 carbon atoms in the alkylene radical and an initiator molecule containing 2 to 8, preferably 2 to 4, active hydrogen atoms. Suitable alkylene oxides include 1,3-propylene oxide, 1,2- or 2,3-butylene oxide, and preferably, ethylene oxide and 1,2-propylene oxide. Tetrahydrofuran and styrene oxide may also be employed. The alkylene oxides may be used individually, alternatingly in sequence, or in mixtures. Examples of initiator molecules include: water, dicarboxylic acids, such as succinic acid, adipic acid, phthalic acid, and terephthalic acid, N-mono-, N,N- and N,N'-dialkyl-substituted diamines with 1 to 4 carbon atoms in the alkyl radical such as mono- and dialkyl-substituted ethylenediamines, 1,2- or 1,3-propylenediamine, 1,4-butylenediamine, 1,6-hexamethylenediamine, and 4,4'-, 2,4'- and 2,2'-diaminodiphenylmethane, alkanolamines such as ethanolamine, diethanolamine, N-methyl- and N-ethyl-diethanolamine, and triethanolamine, hydrazines and preferably multifunctional, particularly bi- and trifunctional alcohols such as ethylene glycol, propylene glycol, diethylene glycol, dipropylene glycol, 1,4-butanediol 1,6-hexamethylene glycol, glycerine, trimethylolpropane, pentaerythritol, sorbitol and sucrose.

Primarily used are di- and/or trifunctional polyoxyethylene polyether polyols having molecular weights of 200 to 8,000, preferably of 800 to 6,000, and hydroxyl numbers of 15 to 800, preferably of 25 to 200, which contain ethylene oxide as well as 1,2-propylene oxide units in the oxyalkylene chain. These units may be arranged either randomly or in blocks in the oxyalkylene chain.

Particularly used are trifunctional polyoxyalkylene polyether polyols which preferably have primary hydroxyl groups having hydroxyl numbers of 20 to 40.

Polyepoxides which contain at least 2, preferably 2 to 3, epoxide groups in the molecule are suitable for the manufacture of the polymer dispersions in the polyols. Suitable examples for application include epoxide resins from the reaction of polyphenols and epihalohydrins, polyalcohols and epihalohydrins, amines and epihalohydrins, sulfur-containing compounds and epihalohydrins, polycarboxylic acids and epihalohydrins, polyisocyanates and glycide, epoxidation of olefinically-unsaturated compounds, epoxide resins which are obtained by polymerization of olefinically-unsaturated monoepoxides, as well as epoxide resins from triazine derivatives and other heterocyclic compounds. Examples include: butadiene diepoxide, epoxide resins based on 2,2-(4,4'-dihydroxydiphenyl)-propane, and epichlorohydrin ( ®Epikote brands by Shell AG), terephthalic acid diglycyl ester, triglycidylisocyanurates ( ®Araldite brands of Ciba-Geigy), and others. Preferably used are epoxide resins which are directly soluble in the polyols. Of course, those epoxide resins which can be brought into solution by using a solubilizing agent if necessary may also be employed. Solubilizing agents which chemically participate in the hardening reaction are used. On a preferred basis, these include low viscosity monoepoxides or primary monoamines.

Those epoxide resin hardeners which may be employed are primarily the bifunctional, preferably di- to hexafunctional, and particularly di- to tetrafunctional, primary and secondary amines, hydrazines and hydrazides as well as ammonia. Suitable hydrazines and hydrazides include hydrazine, N,N'-dimethylhydrazine, N,N-dimethylhydrazine, N,N'-diethylhydrazine, carbodihydrazide, adipic acid dihydrazide, and tetramethylene-1,4-carboxylic acid hydrazide.

Preferably used are alkyl-substituted aliphatic, cycloaliphatic, and/or aromatic polyamines, particularly di-primary amines with 1 to 4 carbon atoms in the alkyl radical and molecular weights of 30 to 600, preferably 60 to 400. Examples include aliphatic di- and polyamines with 2 to 12, preferably 2 to 6, carbon atoms in the alkylene radical such as ethylenediamine, 1,4-butylenediamine, 1,6-hexamethylenediamine, 1,10-decamethylenediamine, N,N'- and N,N-dimethylethylenediamine, N,N'-dimethylbutylenediamine, N-methyldipropylenetriamine and dipropylenetriamine, cycloaliphatic di- and polyamines such as 1,4- and 1,3-cyclohexylenediamine, 4,4'-, 2,4'- and 2,2'-diaminodicyclohexylmethane, 1-methyl-2,4-diaminocyclohexane, 1-methyl-2,6-diaminocyclohexane, and 3-aminomethyl-3,5,5-trimethylcyclohexylamine, and aromatic di- and polyamines such as 1,4-phenylenediamine 4,4'-diaminodiphenyl, 1,5-naphthylenediamine, 4,4'-, 2,4'- and 2,2'-diaminodiphenylmethane, substituted diaminodiphenylmethanes such as 3,3',5,5'-tetraalkyl-4,4'-diaminodiphenylmethanes having 1 to 6 carbon atoms in the alkyl radical, and N,N'-dialkyl-substituted-4,4'-diaminodiphenylmethane having 1 to 6 carbon atoms in the alkyl radical, 2,4- and 2,6-toluenediamine as well as the isomer mixtures and polyphenylene polymethylene polyamines. The di- and polyamines may be used individually as well as in mixtures.

The polyamines mentioned above are the most important but not the sole epoxide resin hardeners suitable for the process according to this invention. Basic polyamides, amides, imidazolines, cyclic dicarboxtlic acid anhdyrides, polycarboxylic acids, phosphorus-containing compounds such as phosphoric acid and acid phosphoric esters, particularly monoethylphosphate are examples of other suitable resin hardeners.

As a rule, the epoxide resin hardeners are added on an equivalent basis. In addition to this, catalytic hardening can also be used to a small extent.

The molecular weights of the polymers dispersed in the polyols are determined by the relative ratios of the reagents. The polyepoxides are advantageously reacted with the amines, hydrazines, hydrazides and ammonia, in such relative ratios that 0.80 to 1.10 NH groups, preferably approximately 1 NH group per epoxy group, are present in the reaction mixture.

The polymer polyol dispersions according to this invention are preferably produced in the absence of dispersing agents.

Depending upon the selection of the raw material components, it may, however, under certain circumstances, be appropriate to use dispersing agents in quantities of 0.1 to 10 percent by weight, preferably of 1 to 5 percent by weight, based on the weight of the employed polyepoxides and epoxide resin hardeners. Suitable examples for this purpose include dispersing agents such as silicones, glycerides, sulfated oils and others.

In the example all parts are by weight.

EXAMPLE 1

In 760 parts of a polyether polyol produced by reacting glycerine with propylene oxide and ethylene oxide and having a hydroxyl number of 34 and approximately 73 percent primary hydroxyl groups, 190 parts of an epoxide resin based on 2,2-(4,4'-dihydroxydiphenyl)-propane and epichlorohydrin having an epoxide value of 0.53 (commercial product ®Epikote 828 by Shell AG) and 27 parts of dipropylene triamine were dissolved. The resultant solution was completely clear. After standing for 24 hours at 20° C. without being agitated, the polymer precipitated in the form of fine particles having an average particle diameter of 1 micron. The resulting dispersion was stable in that it displayed no sediment after 6 months storage.

EXAMPLE 2

A product prepared in a manner similar to that of Example 1 was allowed to stand at 40° C. After two hours, the solution began to cloud. After 24 hours, the polymer was totally precipitated in the form of spherical particles having an average particle diameter of 3 microns. The resultant polymer polyol dispersion displayed no sediment after more than 4 months storage.

EXAMPLE 3

In 760 parts of a bifunctional polyoxyalkylene polyether polyol based on the reaction of dipropylene glycol and propylene oxide, having a hydroxyl number of 35 and a molecular weight of 6,000, 100 parts of a bifunctional epoxide resin with an epoxide equivalent weight of 190 (commercial product Epikote 828 by Shell AG) as well as 24.3 parts of dipropylene triamine and 10.6 parts of diethanolamine were added in sequence. In the course of several hours at a temperature of 5° C., the polymer precipitated from the clear solution in the form of fine spherical particles having an average particle diameter of 1 micron. After a storage of 18 months, the stable dispersion displayed a slight precipitate which was completely redispersed by slight agitation.

EXAMPLE 4

In 325 parts of a polyester polyol prepared from adipic acid and diethylene glycol (OH number 42) which is liquid at room temperature, 31.7 parts of an epoxide resin, soluble in the polyester polyol, having an epoxide equivalent weight of 167 and 4.5 parts of dipropylene triamine were dissolved in sequence. After being allowed to stand at 25° C., the resulting polymer began to precipitate from the clear solution in the form of spherical particles having an average particle diameter of 2 to 4 microns after 2 hours. After 48 hours, the polyaddition reaction was largely completed. The resultant polymer polyol dispersion was storage stable for more than 6 months.

EXAMPLE 5

A polyester polyol which is liquid at room temperature and which was produced by the condensation of adipic acid with a mixture of 1,4-butanediol, 1,5-pentanediol and 1,6-hexanediol, having a hydroxyl number of 35, an acid number of 0.5, and a viscosity of 2,500 mPas measured at 75° C., was mixed with a diepoxide (Epikote 828), dipropylene triamine, and trichlorofluoromethane in a weight ratio of 20:2.5:1:2. The components were completely soluble in each other. After allowing the mixture to stand at room temperature for 24 hours, a fine particle dispersion was obtained with an average particle size of less than 1 micron. After being stored for 18 months, this product did not show any sediment formation.

The embodiments of the invention in which an exclusive privilege or property is claimed are defined as follows:

1. A process for the manufacture of stable polymer polyol dispersions with a narrow particle size distribution by means of precipitation polymerization wherein polyepoxides are reacted with epoxide resin hardeners, said hardeners selected from the group consisting of amines, hydrazines, hydrazides, ammonia and mixtures thereof in the presence of liquid polyols selected from the group consisting of di to octafunctional polyester polyols and polyoxyalkylene polyether polyols said polyols having molecular weights of 200 to 8000.

2. A stable polymer polyol dispersion with a narrow particle size distribution prepared by reacting polyepoxides with epoxide resin hardeners said hardeners selected from the group consisting of amines, hydrazines, hydrazides, ammonia and mixtures thereof in the presence of liquid polyols selected from the group consisting of di to octafunctional polyester polyols and polyoxyalkylene polyether polyols said polyols having molecular weights of 200 to 8000.

3. The process of claim 1 wherein the polymer polyol dispersion contains polymer particles with an average particle size of 0.01 micron to 5 microns.

4. The product of claim 2 wherein the polymer polyol dispersion contains polymer particles with an average particle size of 0.01 micron to 5 microns.

* * * * *